June 24, 1958  A. D. F. MONCRIEFF  2,839,968
HOBBING MACHINE
Filed Nov. 3, 1954  15 Sheets-Sheet 1

INVENTOR.
Alexander D. F. Moncrieff.
BY
Harness, Dickey & Pierce.
ATTORNEYS.

INVENTOR.
Alexander D. F. Moncrieff
BY
Harness, Dickey & Pierce
ATTORNEYS

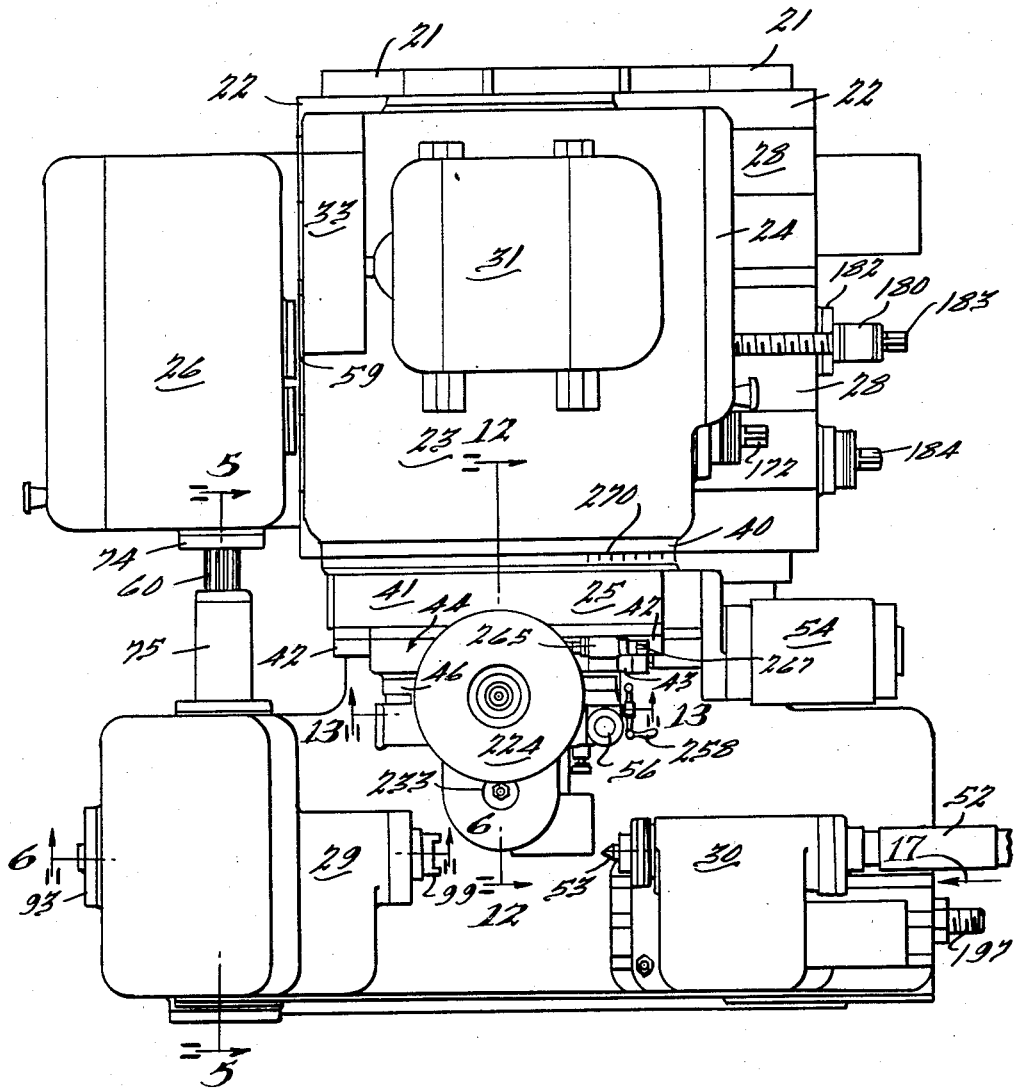

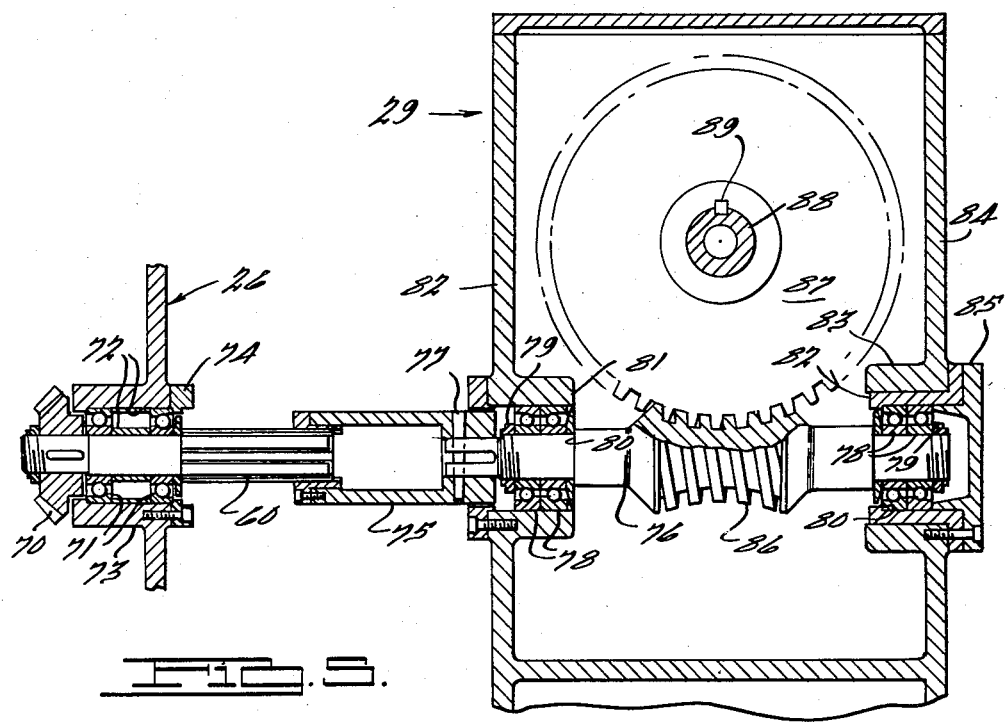
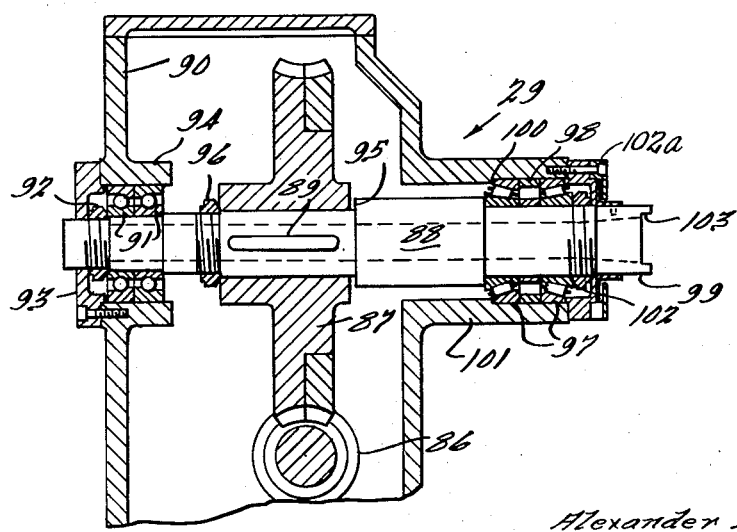

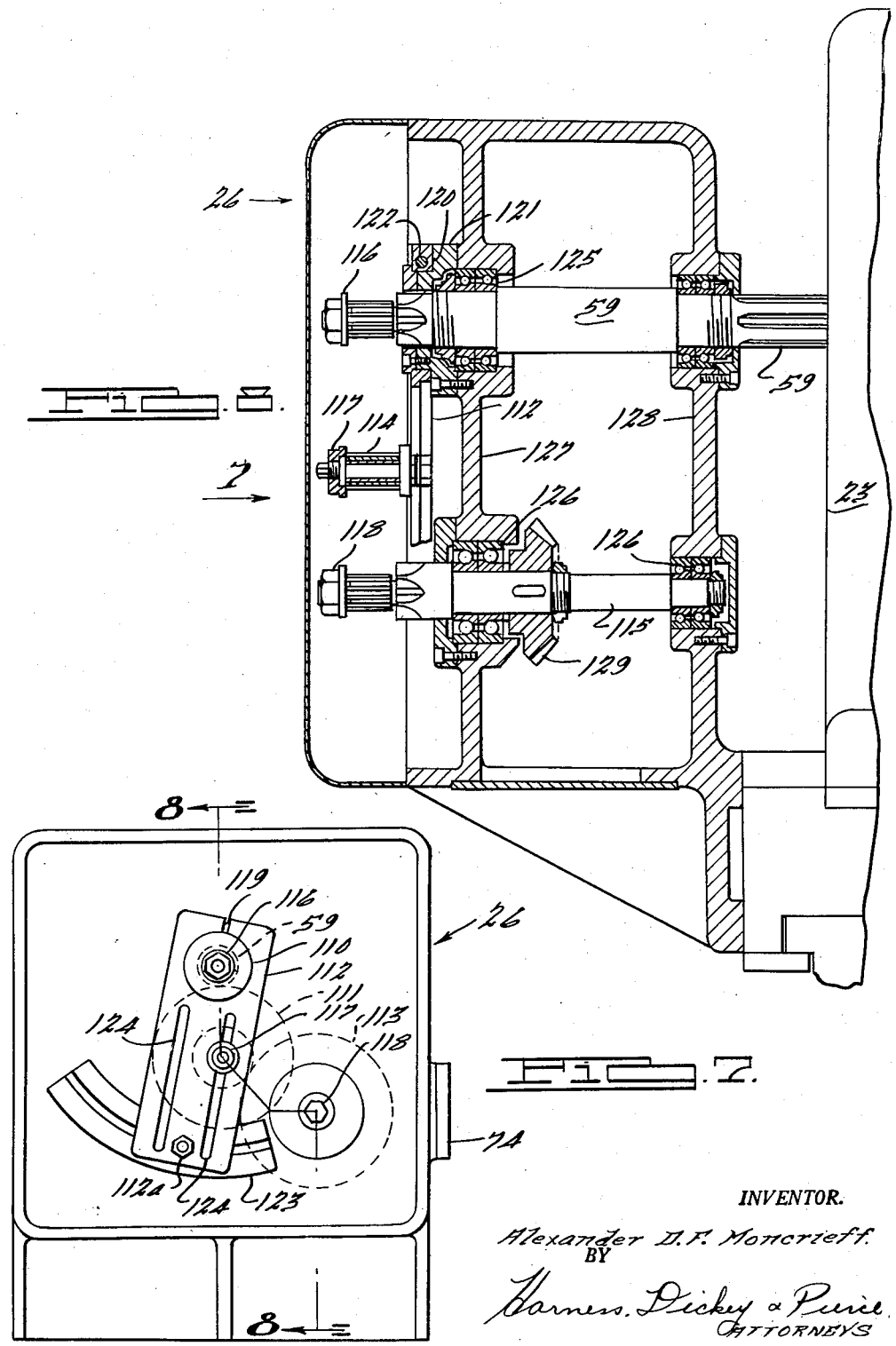

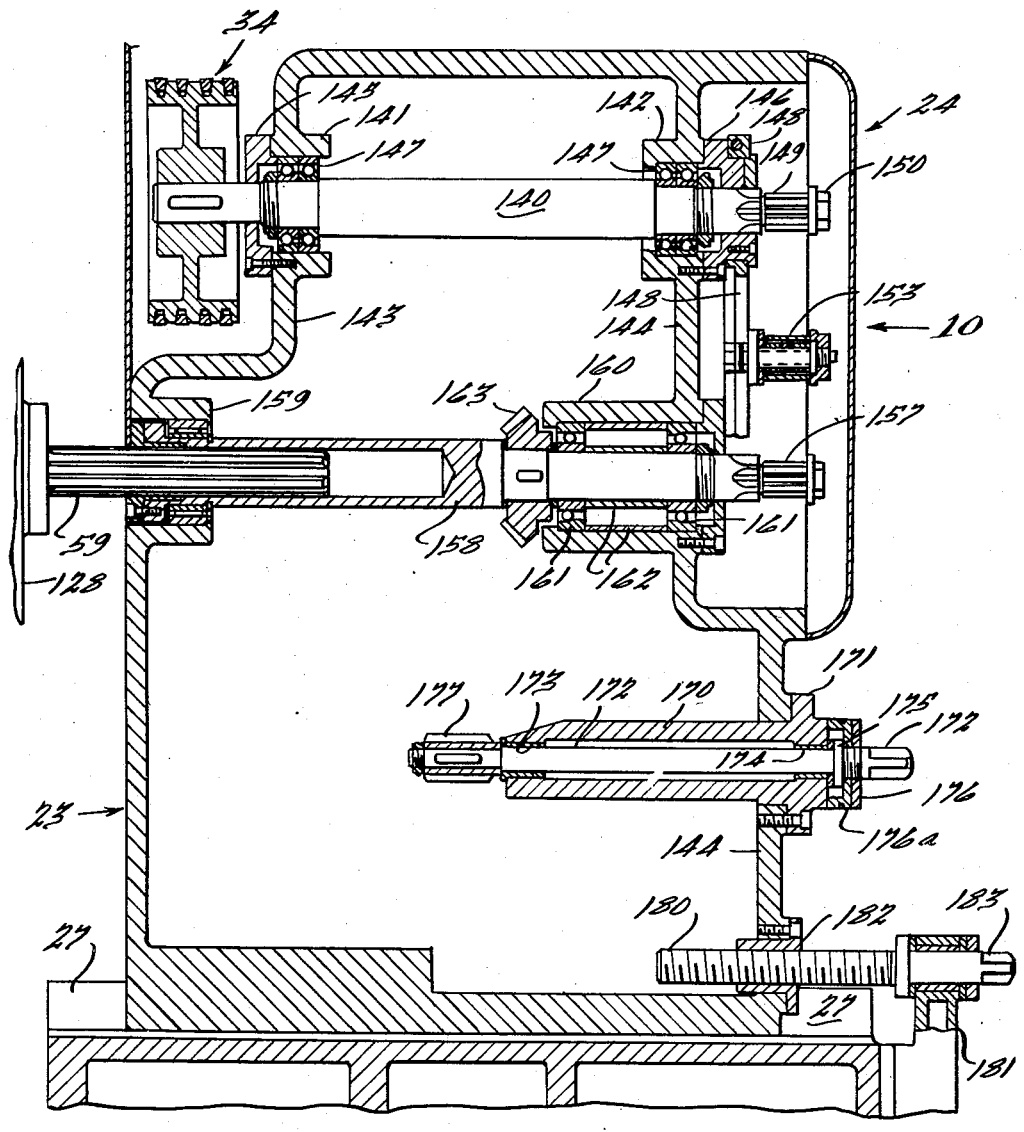

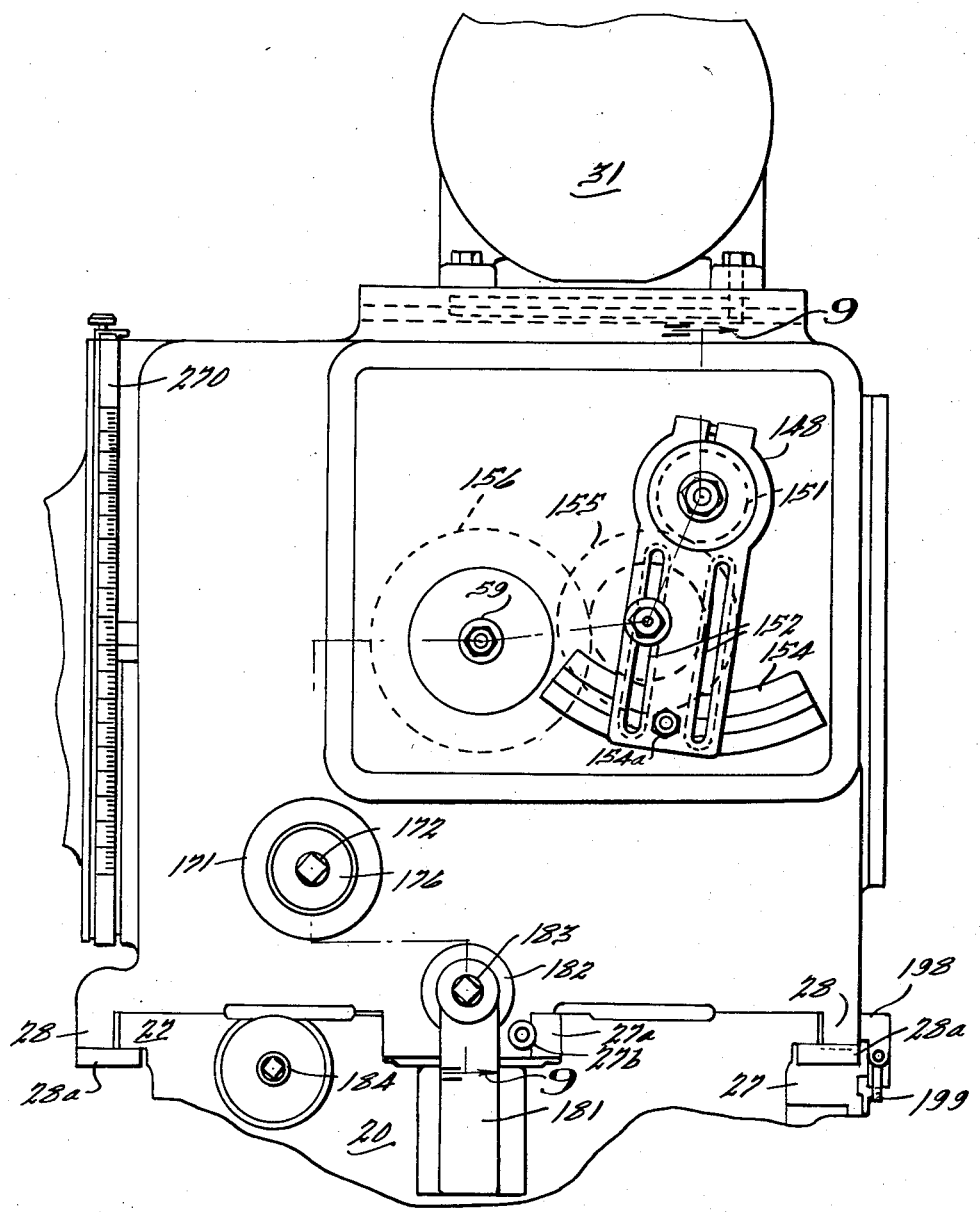

June 24, 1958  A. D. F. MONCRIEFF  2,839,968
HOBBING MACHINE

Filed Nov. 3, 1954  15 Sheets-Sheet 9

INVENTOR.
Alexander D.F. Moncrieff.
BY
Harness, Dickey & Pierce
ATTORNEYS

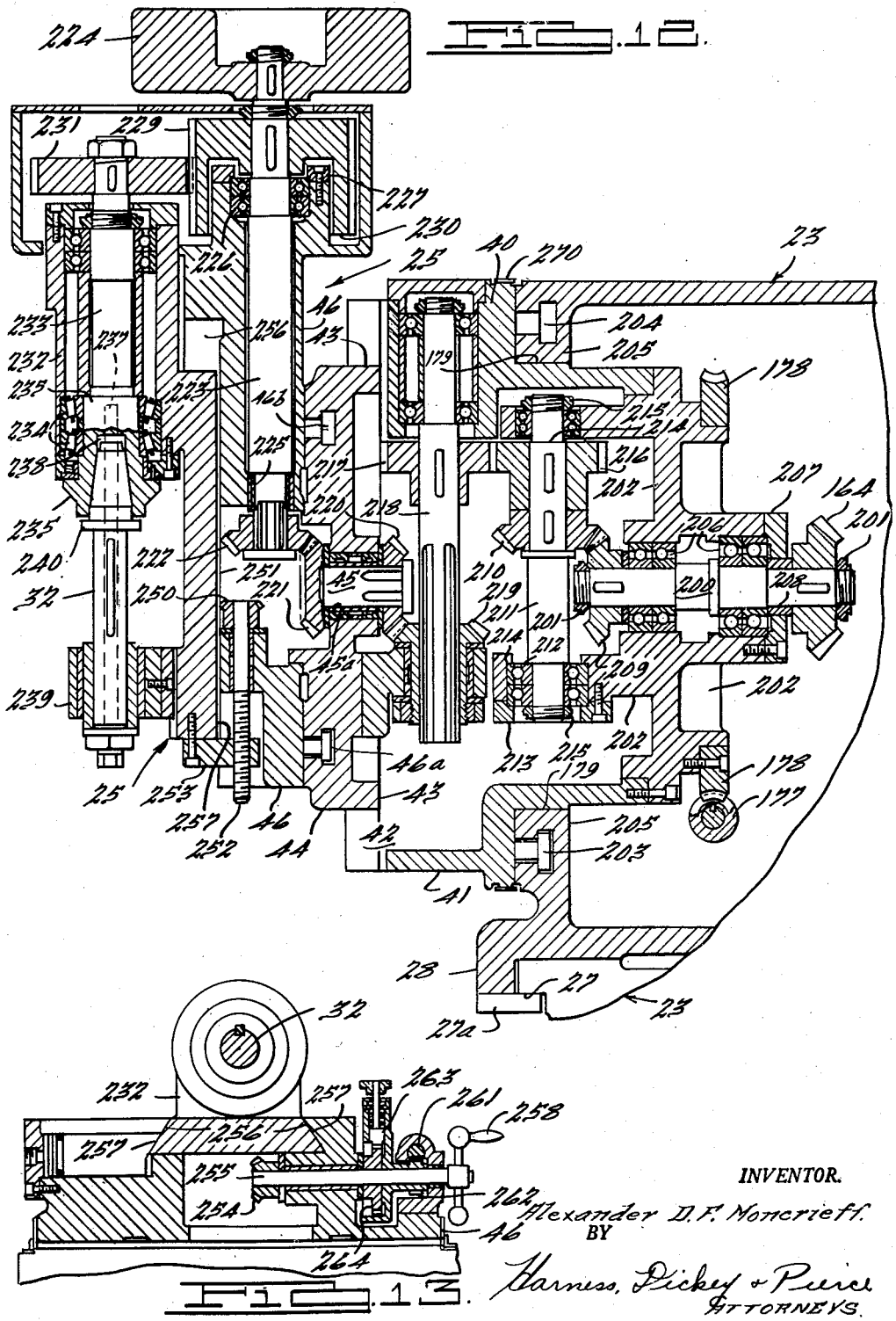

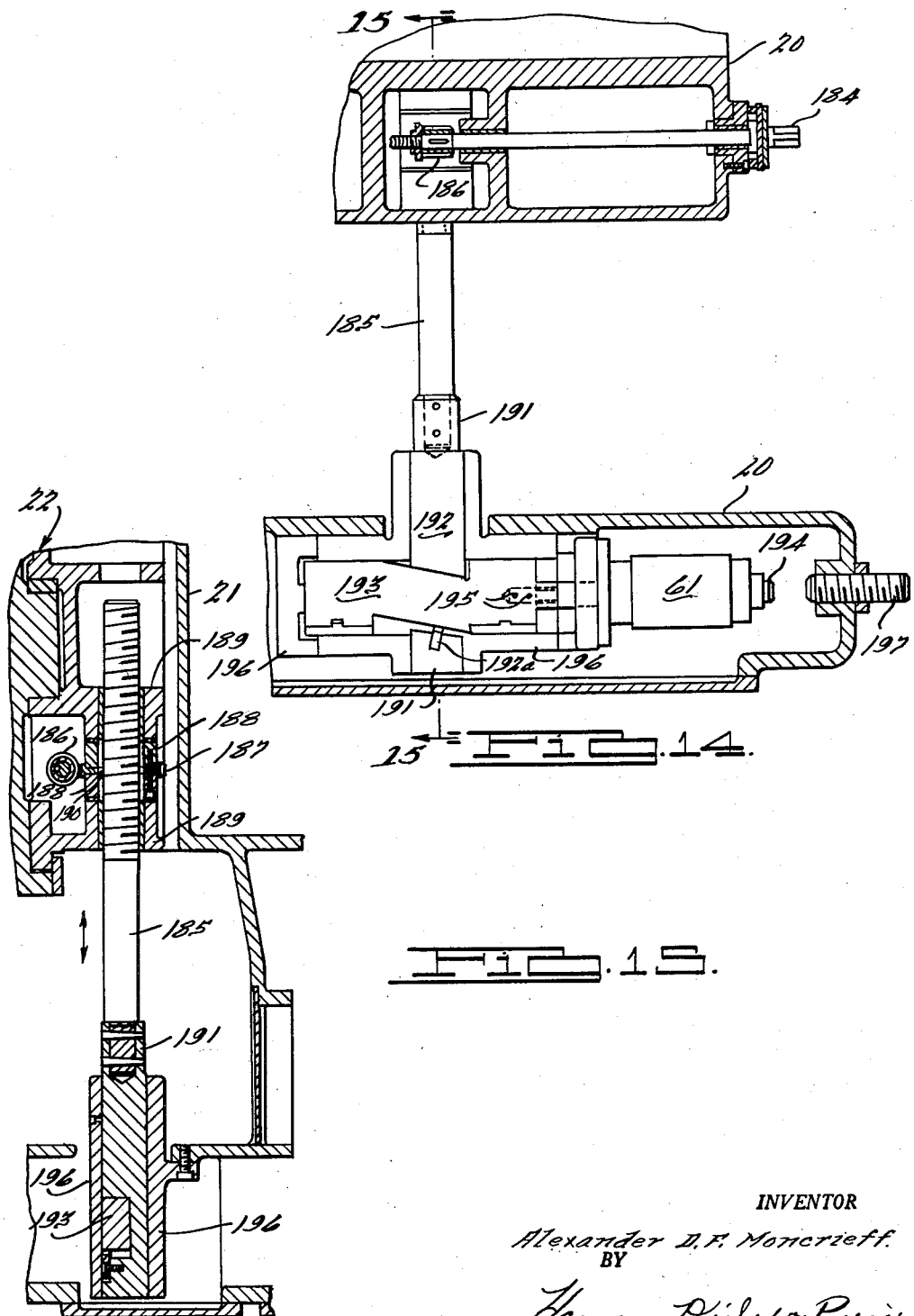

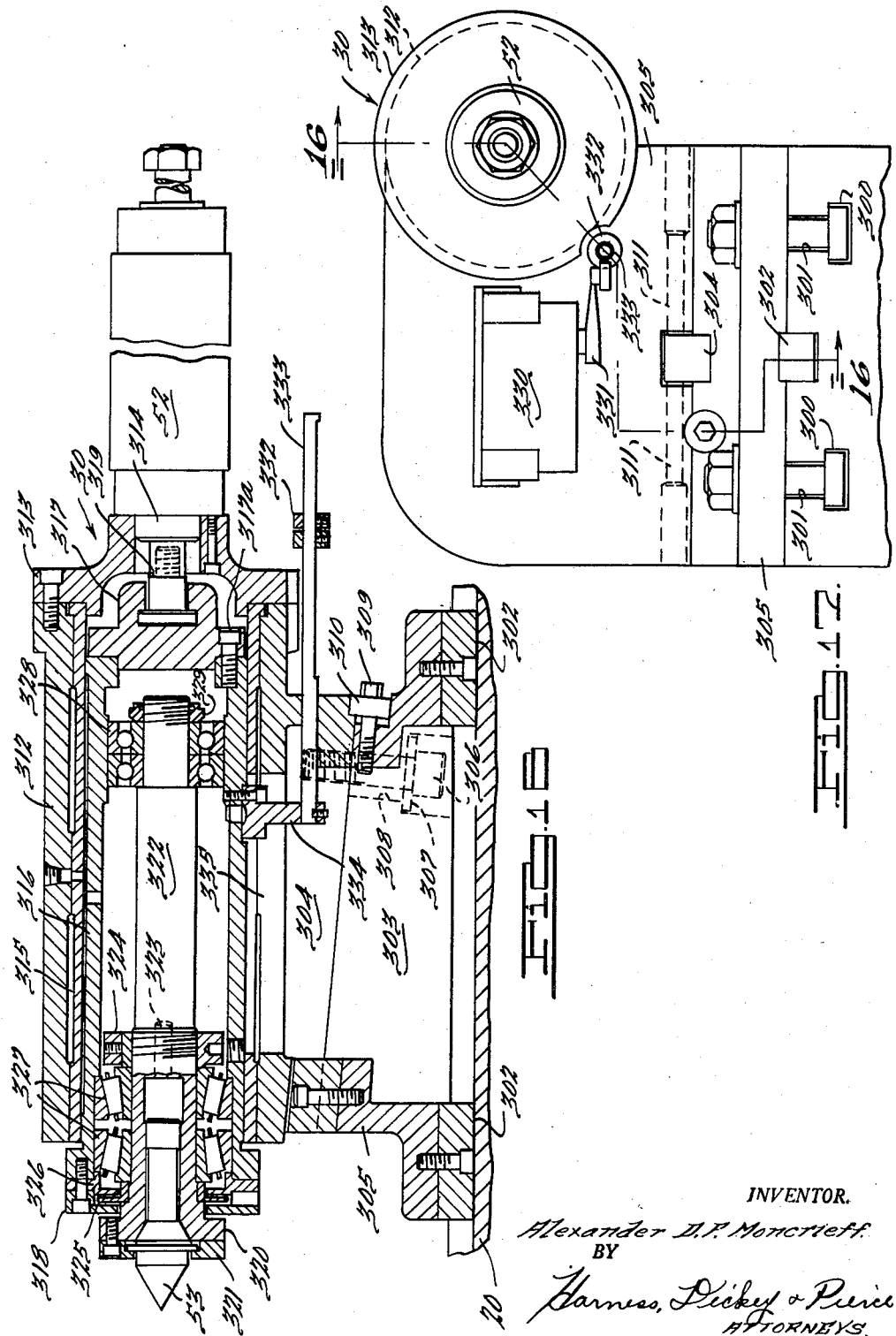

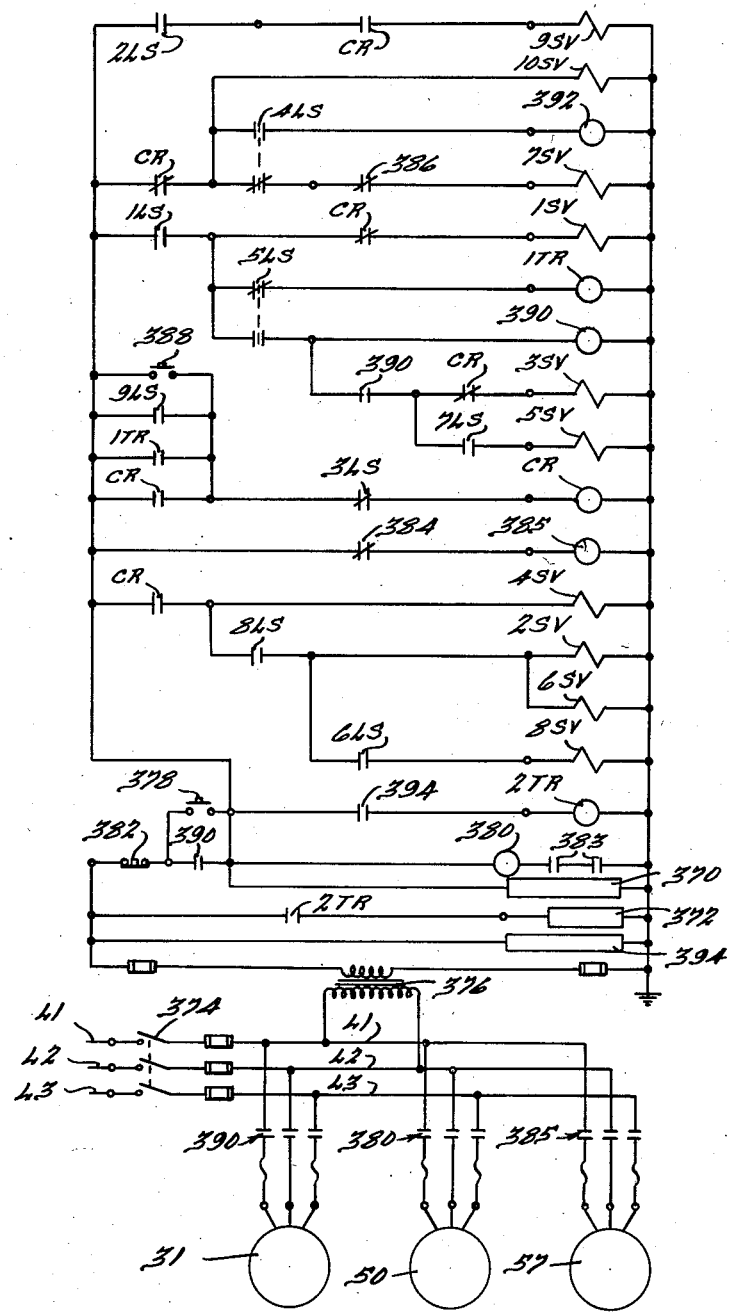

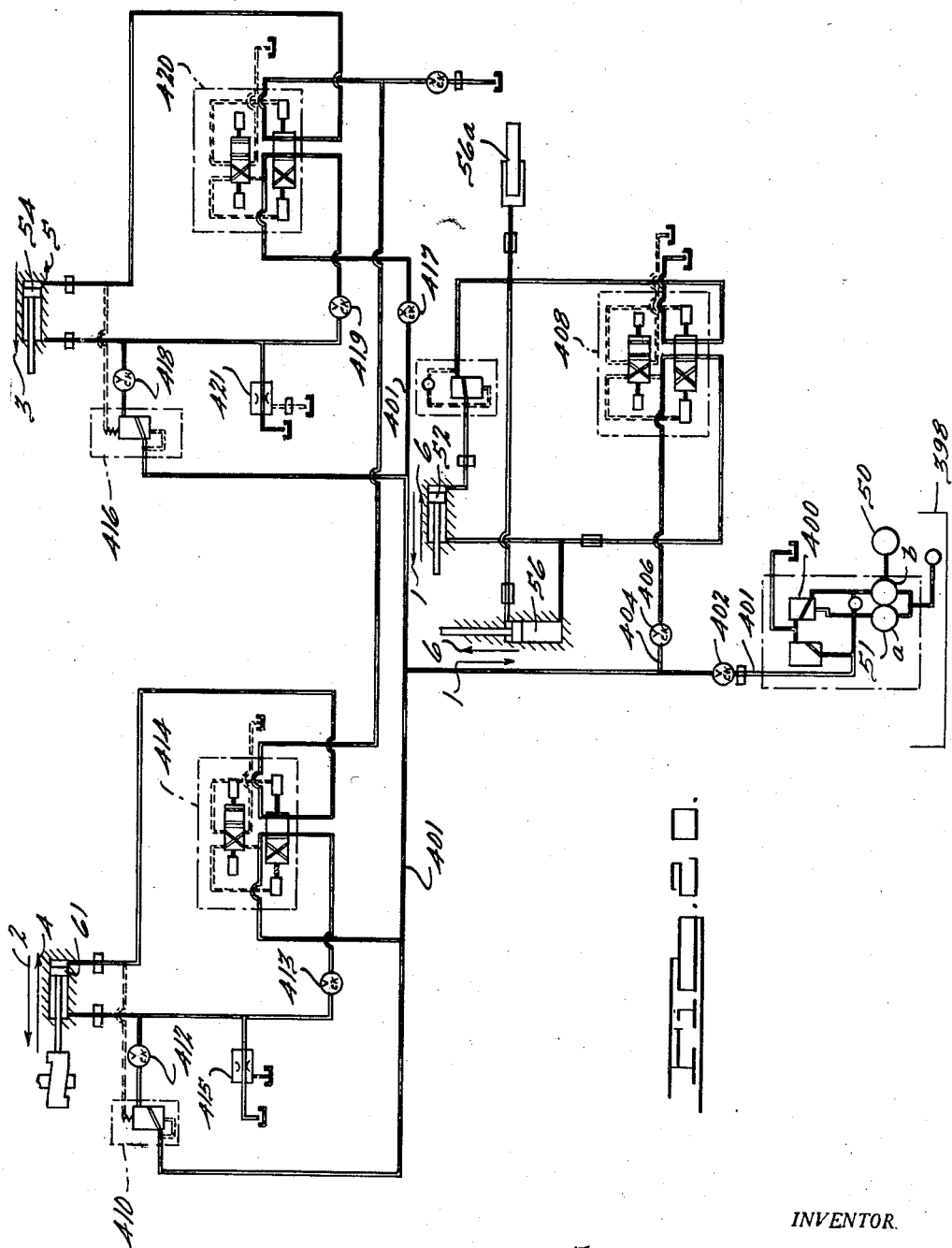

United States Patent Office 2,839,968
Patented June 24, 1958

2,839,968

HOBBING MACHINE

Alexander D. F. Moncrieff, Bloomfield Hills, Mich., assignor to Michigan Tool Company, Detroit, Mich., a corporation of Delaware Application November 3, 1954, Serial No. 466,481

2 Claims. (Cl. 90—4)

This invention relates generally to machines for hobbing gear teeth, splines, or the like, and, in particular, to new and useful improvements in such hobbing machines.

The invention provides a hobbing machine having a universal hob carrier or spindle head that embodies all required feeds and adjustments for hobbing various types of parts, such as both spur and helical gears. The improved head, in addition to providing for rotation of the hob and cross feed of the hob across the work at the desired helix angle, incorporates adjustments for plus or minus hob thread angles, left or right gear helix angles, and hob position shift. The improved hobbing machine of this invention can utilize either climb or conventional hobbing and plunge cutter feed. It is designed for high cutter speeds and to cover a range of about 60–900 R. P. M. of the hob.

Hobbing machines are special machines wherein the workpiece and hob are rotated in timed relation to produce on the workpiece a series of generated teeth. The hob used for this purpose has cutting projections or teeth on its surface which cut into the workpiece and generate thereon teeth of the correct lead, tooth form, spacing, helix angle, etc. As the cutting process progresses, the center distance between workpiece and hob is decreased by infeeding until hob and workpiece are on the same center distance as designed for the finished gearset. At this point, the correct helix angle of the gear teeth has been generated. Due to the fact that the hob teeth necessarily are thinner than the finally-desired interdental space, it is then necessary to sidefeed or crossfeed the hob to clean out excess material and generate the final tooth thickness and shape, meanwhile maintaining the correct center distance, end position and side position relationships between workpiece and hob and without disturbing the geared time rotation relation. Backlash between members of matched gearsets can be adjusted to a considerable extent by control of sidefeed in the second step of the hobbing process.

The above sequence of steps has ordinarily been carried out heretofore on spur gears with the hob mounted vertically and projecting from a table and the workpiece caused to travel longitudinally across the face of the hob or vice versa. In one type of machine, a hob slide is used to move the hob across the workpiece while in other types the hob is stationary and the workpiece is passed across the hob. In most cases, these types of machines can be modified by fixtures, guides and other additive or subtractive features to cut helical gears and other special gear forms wherein relative oblique movement as well as longitudinal or axial movement of the hob with respect to the face of the workpiece is required to generate the proper tooth form and helix angle.

It is a principal object of this invention, therefore, to provide a gear-hobbing machine having a hob carrier which can be moved axially, obliquely and vertically across the face of a workpiece, as well as parallel thereto, all without the installation of special jigs, guides or fixtures.

It is also an important object of this invention to provide a gear-hobbing machine wherein an angularly displaceable hob carrier is mounted on a compound slide which moves the hob carrier axially and at right angles to the workpiece and wherein the hob carrier itself has a slide which is angularly displaceable with respect to the hob.

Still another important object is to provide a gear-hobbing machine having means for automatically shifting the hob vertically with respect to the work during the same or successive hobbing operations so as to utilize the full cutting face of the hob.

Another object of this invention is to provide a gear-hobbing machine wherein infeeding and sidefeeding at the correct angular position of the hob is automatically accomplished, respectively, by means of a power-operated infeed mechanism and a power-operated sidefeed slide.

Other objects and advantages will be apparent, or will become apparent, from the following more detailed description of the invention when taken in conjunction with the accompanying drawings, in which:

Fig. 4 is a plan view of the gear-hobbing machine of this invention;

Fig. 5 is an assembly view in section of the worm drive for the headstock or workspindle, the view being taken along the line 5—5 of Fig. 4;

Fig. 6 is an assembly view, in section, of the workspindle or headstock of the gear-hobbing machine of Figs. 1 to 5, the section being taken along the line 6—6 of Fig. 4;

Fig. 7 is an end view, with the outer cover removed, of the ratio gear box, the view being taken in the direction of the arrow 7, Fig. 8;

Fig. 8 is an assembly view, in section, of the ratio gear box, the section being taken along the line 8—8 of Fig. 7;

Fig. 9 is an assembly view, in section, of the change gear box, the section being taken along the line 9—9 of Fig. 10;

Fig. 10 is an end view, with the cover removed, of the change gear box, the view being taken in the direction of the arrow 10 in Fig. 9;

Fig. 12 is a side elevational view in section of the hob mounting and drive mechanism of Figs. 1 to 11, the section being taken along the line 12—12 of Fig. 4 with the normally horizontal crossfeed ways rotated to a vertical position to facilitate illustration;

Fig. 13 is an enlarged fragmentary view in section of the hob shifter mechanism, the section being taken along the line 13—13 of Fig. 4;

Fig. 14 is an enlarged assembly view, in section, of the Z-bar and infeed screw, the section being taken along the line 14—14 of Fig. 2;

Fig. 15 is an enlarged assembly view, in section, of the Z-bar and infeed assembly, the section being taken along the line 15—15 of Fig. 14;

Fig. 16 is an assembly view, in section, of the tailstock, the section being taken along the line 16—16 of Fig. 17;

Fig. 17 is an end view of the tailstock assembly showing in particular the limit switch mounting, the view being taken in the direction of the arrow 17 in Fig. 4;

Fig. 19 is a schematic wiring circuit of the electrical controls necessary for the automatic operation of the machine of Figs. 1 to 18; and Fig. 20 is a schematic hydraulic piping diagram for the hydraulic control circuit necessary for the automatic operation of the machine of Figs. 1 to 18 in conjunction with the electrical controls of Fig. 19.

Figure 1:
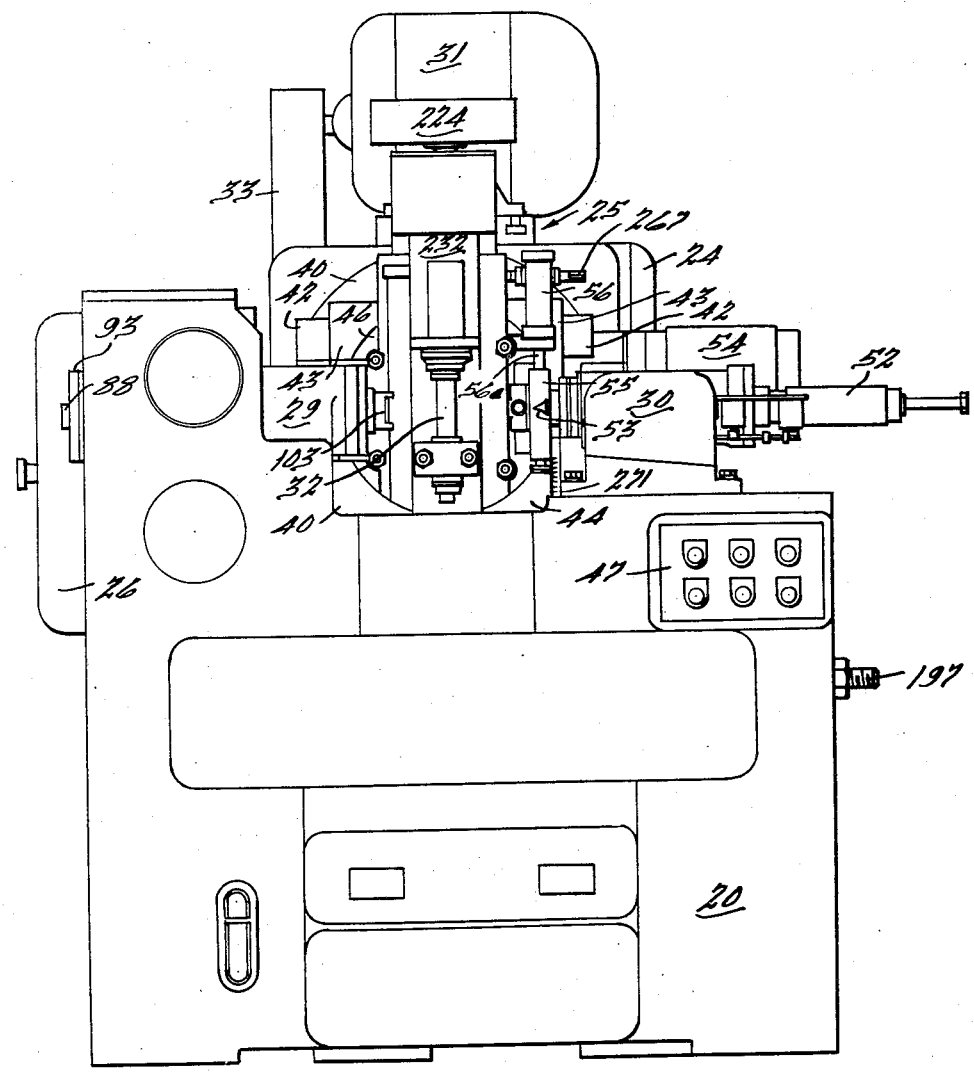
Figure 1 is a front elevational view of the gear-hobbing machine of this invention, showing the hob carrier device in a vertical position such as obtains when cutting spur gears.

Reference is first made to the general views of Figs. 1 to 4 which illustrate the general construction and general details of operation of the gear-hobbing machine of this invention. The machine has a suitable heavy cast iron horizontally T-shaped base 20 with the top of the T facing the front. On the upper surface of the rearwardly-extending leg of the T (Fig. 3) are a pair of lower bed ways 21 on which are engaged the mating lower slide members 22 of a combined assembly including a main drive gear box 23 (Fig. 4), speed or change gear box 24, hob carrier and drive assembly 25, ratio gear box 26, and an upper slide mechanism 27—28. By means of the slide 21—22, the entire combined gear box assembly is movable for infeeding purposes toward and away from, and at right angles to, the axis of a headstock 29 and tailstock 30 in which is supported a workpiece or gear blank. The gear box 23 is held in place on the upper bed members 27, 27 (Fig. 2) by means of a gib arrangement 27a. Mounted atop the combined assembly is a large main drive electric motor 31 which operates the hob arbor 32, hob spindle 235, and headstock 29. As shown in Figs. 1 to 4, a cover or guard 33 conceals a main multiple V-belt and pulley drive 34 to be described later on in connection with Figs. 9 and 18.

The upper slide mechanism 27—28 forms with slide 21—22 a compound slide mechanism which supports the combined gear box-drive mechanism mentioned above, this slide permitting movement of the entire hob carrier and drive mechanism 25 parallel to the headstock-tailstock axis to position it for various sizes of gear blanks and hobs. As will be explained later, the movement of the hob parallel to the headstock-tailstock axis for sidefeeding purposes during hobbing operations is effected by a hydraulic cylinder operatively connected to the hob carrier assembly.

Figure 2:
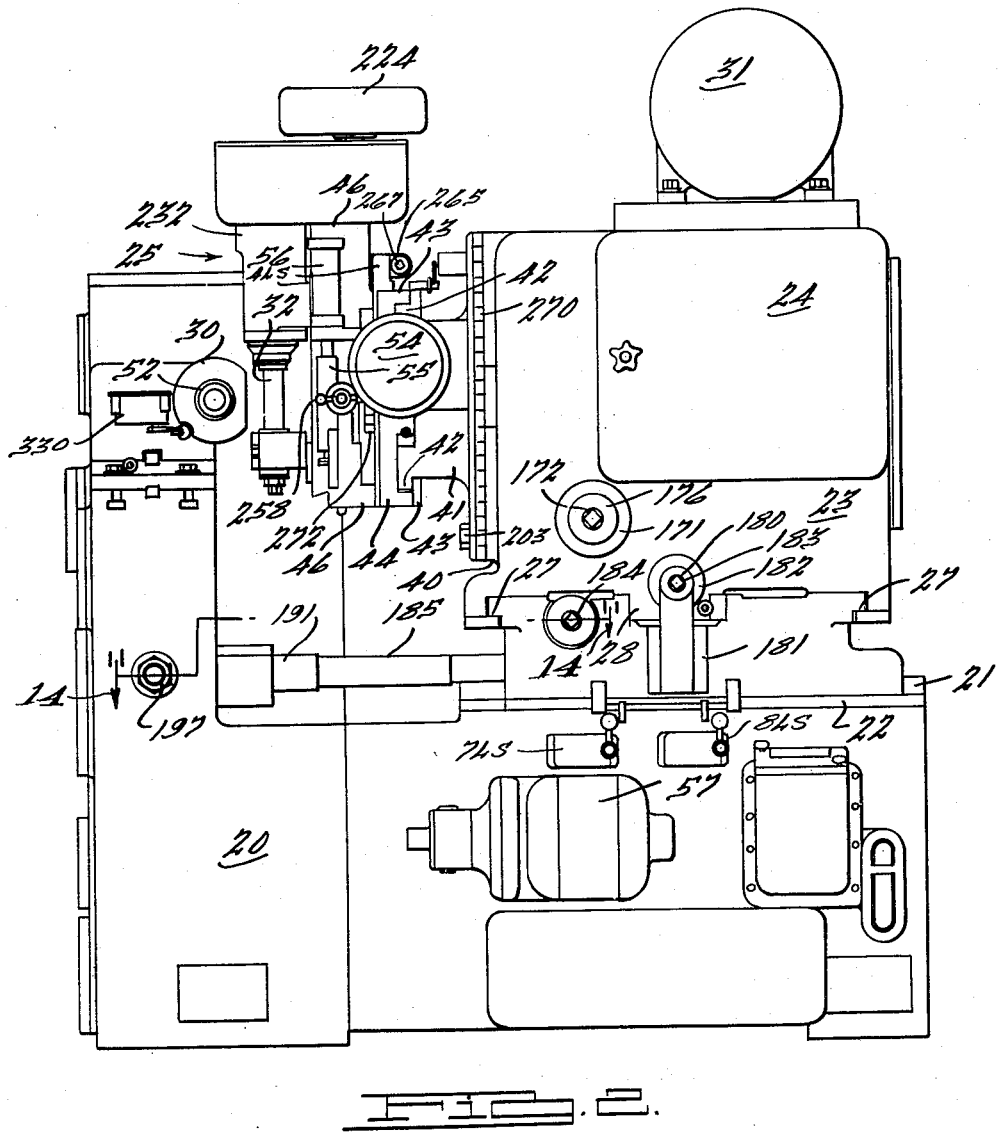
Fig. 2 is a side elevational view of the right-hand side of the gear-hobbing machine of this invention.
Figure 3:
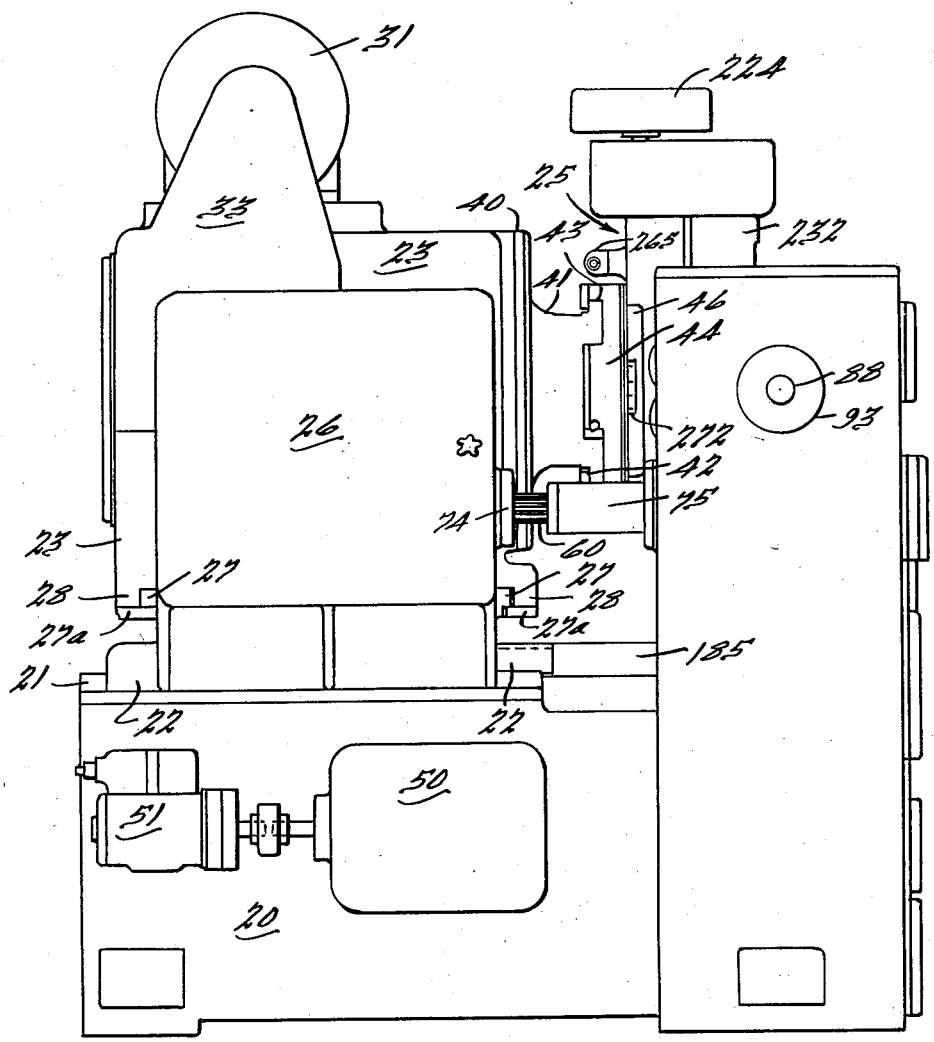
Fig. 3 is a side elevational view of the left-hand side of the gear-hobbing machine of this invention.

As will appear generally in Figs. 3 and 4, the hob carrier and drive mechanism 25 comprises a generally circular plate 40 releasably bolted to the front of the main drive box 23 and capable of angular adjustment, the plate 40 having an integral forwardly-projecting channel-shaped portion 41 (Fig. 3), the outer edges of which are machined to form transverse slide ways 42. On the latter are slidably engaged mating slide members 43 machined into a hob-spindle bracket or swivel 44. The latter has a central pivot or swivel shaft 45 (not shown in Figs. 1 to 4, but see Fig. 12) on which is secured a rotatable plate-like outer hob-carrier bracket 46 which supports the hob spindle 235, the hob arbor 32 and drive mechanism 25. The slide 42—43 permits horizontal movement for sidefeeding of the hob across the face of the workpiece. The hob carrier bracket 46 has its slotted inner surfaces machined to form a slide 256 for the hob shifter mechanism in which the hob carrier housing 232 slides up and down on slide 256. As will appear in Fig. 11, a screw 264 is threaded into the hob spindle swivel and journalled in a bearing 265 attached to the sidefeed slide 42 and held in place by a collar 266. When a crank is placed over the squared end 267, the hob carrier head assembly may be rotated from side to side on pivot 45 to align the hob spindle housing at the correct hob lead angle.

In Fig. 1, there appears a control panel 47 which contains the electrical stop-start buttons and the electrical switches for operating the various valves of the hydraulic motors or cylinders for effecting movement of the various slide mechanisms and the tailstock. The control panel 47 is part of the electrical controls circuit shown in Fig. 19.

As shown in Figs. 2 and 3, on the sides of the machine base 20 there are mounted several motors and pumps which furnish auxiliary power. On the left-hand side of the machine there is a motor 50 and a direct-coupled hydraulic pump 51 which pumps oil into an oil-pressure tank (not shown) inside base 20. From the latter oil-pressure tank hydraulic fluid is withdrawn to operate the various hydraulic cylinders which operate various reciprocating parts of the apparatus, all as will be more clearly described in connection with the hydraulic circuit of Fig. 20. For example, the tailstock assembly 30 is provided with a hydraulic cylinder and piston unit 52 which moves the tailstock center 53 inwardly and outwardly into and out of engagement with a work holder. Similarly, the slide member 44 is provided with a hydraulic cylinder and piston unit 54 for reciprocatively moving the hob arbor 32 and spindle 235 axially across the workpiece for sidefeeding purposes. The piston of cylinder 54 (Fig. 11) has a piston rod 54a which is screwed over a projecting stud bolt 54b tapped into slide member 44. Also, the hob shifter 55 has a small hydraulic cylinder and piston unit 56 for moving the hob carrier spindle 235 up and down to utilize the full surface of the hob. Similarly enclosed in the base 20 is a hydraulic cylinder and piston unit 61 (see Fig. 14) for operating the Z-bar and main infeed screw assembly.

On the right-hand side (Fig. 2), a direct-coupled coolant supply motor and pump unit 57 is provided for supplying a continuous stream of cutting lubricant or cooling fluid to the hob. Also shown in Fig. 2, limit switches 7LS and 8LS are mounted adjacent lower slide 21—22. As shown most clearly in Figs. 4 and 9, the main drive motor 31 drives a belt drive 34 which in turn operates the change gears in change gear box 24, the rotation being transmitted therefrom to ratio gear box 26 by means of an elongated or telescoping splined shaft 59 (see Fig. 4). The rotational ratio of the workpiece with respect to the hob, as determined by the ratio gear box 26, is then transmitted to the headstock assembly 29 by means of a similar telescoping splined shaft 60. Shaft 59 is long enough to remain in engagement when the speed gear box 24 is moved away from the ratio gear box 26 on slides 27—28 and likewise the shaft 60 is long enough to remain in engagement when the entire combined assembly of main drive box 23, change gear box 24, ratio gear box 26 and hob-carrier assembly 25 is moved on slide ways 21—22 away from the axis of the headstock 29 and tailstock 30.

HEADSTOCK

Referring next to Figs. 4, 5 and 6, the details of the headstock 29 and its drive mechanism can more clearly be seen. As shown in Fig. 5, the splined telescoping shaft 60 is driven by a helical pinion gear 70 (located in ratio gear box 26), the shaft 60 being journaled in a pair of ball bearings 71, 71 separated by spacers 72, the entire bearing structure being located in a box 73 located in the wall of ratio gear box 26 and held in place by a bolted-on outer collar 74. The splined shaft 60 is fitted on its other end into a splined collar 75 which in turn is secured to a worm gear shaft 76 by means of a taper pin 77. The splined collar 75 and the end of worm gear shaft 76 are supported in a pair of ball bearing races 78 held in place on shaft 76 in a bearing 81 integral with the wall 82 of headstock 29 by means of a small screw collar 79 which forces bearings 78 against a shoulder 80 integral with shaft 76. The other end of shaft 76 is supported in a second set of ball bearings 78 which rotate in a flanged liner 82 held in place in a bearing boss 83, formed in wall 84 of the headstock assembly 29, by means of a bolted-on cap 85. A second end collar 79 and shoulder 80 is provided to position the bearings 78 on shaft 76.

The shaft 76 carries an integrally cut worm pinion gear 86 which meshes with a helical gear 87 carried by a headstock drive shaft 88. The gear 87 is keyed to shaft 88 by means of a key 89. As shown most clearly in Fig. 6, the left-hand end of shaft 88 projects from the end wall 90 of the headstock. The latter end of the shaft is supported in a double row of ball bearings 91, 91 which are held in place thereon and in bearing boss 94 by a collar 92 and protectively covered by a bolted-on cap 93. Gear 87 is positioned against longitudinal movement on shaft 88 by means of an enlarged shoulder 95 and a lock nut 96. On the right-hand end shaft 88 is supported in a triple row of roller bearings, two tapered thrust roller bearing races 97 on either side of an ordinary roller bearing race 98 to take up end-thrust exerted on the headstock piece 99 by the tailstock cylinder 52. The roller bearings are held in place, on one side, by means of a small shoulder 100 in the headstock housing 101 and on the other by a nut 102 threaded over the end of shaft 88. A cap and gasket assembly 102a protects the bearings 97, 98 against entrance of dirt.

The shaft 88 is hollow near its right-hand or work-engaging end 99, the internal diameter being belled or enlarged to form a taper fit for a workpiece holder or arbor which fits into a ring-shaped opening 103 in the shaft-end 99. It is to be understood that the type of holder used in this end of the headstock will vary considerably depending on the workpiece itself. The shaft 88, however, is driven by the means described, in timed relation with the hob, as will later be more clearly pointed out.

RATIO GEARS

As will be seen most clearly in Figs. 7 and 8, the ratio gear box 26, which drives the headstock assembly 29 just described, is shown to comprise a train of three gears, one of which is a small drive gear 110 attached to the splined upper shaft 59, a larger idler gear 111 supported by a swing bracket 112 and a lower headstock drive gear 113. All three of gears 110, 111 and 113 are mounted on splined-ended shafts 59, 114 and 115, respectively, with easily-removable collars or nuts, respectively, 116, 117, 118 for easy removal of the gears when it is desired to change the rotational ratio between headstock shaft 88 and hob arbor 32. As best shown in Fig. 7, the swing bracket or plate 112 is slotted at 119 to facilitate its mounting over a circular shoulder 120 formed in a collar 121 bolted to wall 127. A bolt 122 is passed transversely through the upper end of the slotted portion to position the bracket 112 in place. The lower end of swing bracket 112 is bolted by a T-bolt 112a to an arcuately curved guide plate 123. Depending on the size of gears 111, 113, the bracket 112 can be positioned at a proper angle to bring all three gears in engagement. Whereas shafts 59 and 115 are fixed, shaft 114 is fitted into one of several shaft guide slots 124, 124 in which the shaft 114 can be moved up and down for engagement of idler gear 111 with the other gears. With this mounting, a considerable range in gear sizes can be employed to obtain nearly any headstock to hob carrier spindle ratio. In most cases, however, the ratio will be about 10:1.

As shown in greater detail in Fig. 7, shafts 59 and 115 are fixedly mounted, shaft 59 in double row, ball bearings 125, 125 on either end and shaft 115 in ball bearings 126, 126. The heavy walls 127, 128 rigidly maintain the alignment of shafts 59, 115. Shaft 115 has a bevel-faced pinion gear 129 which meshes at right angles with a similar gear 70 on the end of shaft 60 for the headstock drive, Fig. 5 showing only the outer collar 74 through which shaft 60 is mounted.

MAIN DRIVE GEARS

The drive for ratio gear box 26, and in fact the main drive for the machine, is most clearly shown in Fig. 9 wherein the main drive pulley cover 33 and the motor 31 are removed. The latter, however, drives the multiple V-belt drive 34 attached to shaft 140, the latter shaft being extended through to the change or speed gear box 24 on the right-hand side of the machine. As before, in the case of the ratio gear box, the shaft 140 is rigidly supported in bearing bosses 141, 142 located, respectively, in walls 143, 144 and flanged bearing retainer collars 145, 146 are provided to hold double-row ball bearings 147 in place. On the right-hand end of shaft 140, a similar split swing bracket 148 (see Fig. 10) is bolted in place over collar 146. The projecting right-hand end 149 of shaft 140 is shown splined (no gear in place) and fitted with a collar 150 to receive gear 151 (see Fig. 10).

As will be seen most clearly in Fig. 10, the swing bracket 148 has a pair of parallel shaft mounting slots 152 in one of which is fastened a short movable shaft 153. The lower end of bracket 148 is attached to an arcuate swing guide plate 154 by means of a single T-bolt 154a. On shaft 153, so mounted, is an idler gear 155 which meshes with a third gear 156 secured to the splined right-hand end 157 of ratio gear box drive shaft 158. The latter extends over to the left-hand side (as viewed in Fig. 9) of the gear box where it is journalled in a bearing boss 159 in wall 143. Shaft 158 has inner splines to receive and engage with the splined end of headstock drive shaft 59. On its right-hand end, shaft 158 is supported in an elongated bearing boss 160 by means of a pair of ball bearing races 161, 161 separated by a pair of concentric spacers 162, 162. Adjacent the inner shoulder of bearing housing 160 there is attached to shaft 158 a bevel-faced pinion gear 163 which engages with a hob carrier take-off drive pinion gear 164 to be described later herein in connection with Fig. 12. Gears 151, 155, and 156 can be readily interchanged to secure any given speed for operating the machine. By changing the above gears, the overall rate of rotation of the hob arbor 32 and hob spindle 235 and headstock shaft 88 can be varied over a considerable range. By changing the corresponding gears, 110, 111 and 113 of the ratio gear box 26, the rate of rotation of the headstock shaft 88 can be varied independently of that of the hob arbor and spindle.

Also shown in Fig. 9 is a projecting square-headed shaft 172 which carries on its inner end a worm gear 177 which in turn engages a large ring gear 178 (Fig. 12) secured to the inner edge of the rotatable hob carrier and drive support casting 202. When a handle or wrench is attached to the squared end of shaft 172, the entire hob carrier and drive assembly 25 can be swiveled from side to side while supported on an annular bearing surface 179 in order to adjust the inclination of the hob spindle to the helix angle of the gear to be cut, as read on scale 270. As will be seen most clearly in Fig. 9, the shaft 172 is supported in bearings 173, 174 fitted inside an elongated shaft support housing 170 and which is held in place by means of a flanged edge, collar 175 and an outer screw-threaded cap 176 and spacer washer 176a. Bearing housing 170 is in turn held in place by means of an integral collar or flange 171 which is bolted to wall 144.

Also shown in Figs. 9 and 10 is the means of manually moving and positioning the drive box 23 and speed gear box 24 on slides 27, 28. This means comprises an elongated threaded screw or bolt 180 freely projecting through an upstanding bracket 181 which is bolted in a vertical position to the downwardly-projecting central portion of slide bed member 27. The inwardly-extending end of screw 180 is threaded through a bushing 182 bolted into the wall 144. When a wrench or handle is affixed to the squared end 183 to turn the latter, the entire gear box assembly may be advanced or retracted on slide bed members 27, 28 parallel to the headstock-tailstock axis so as to initially position the hob during the setting-up operation.

INFEED MECHANISM

Similarly, means are provided for both manual and power-actuated infeed advance and withdrawal movements of the gear box 23, ratio box 26, speed gear box 24, and hob carrier and drive assembly at right angles toward and away from the headstock-tailstock axis. This mechanism is most clearly illustrated in Figs. 2, 10, 14 and 15. The manual adjustment advance shaft 184 is shown as projecting out of the right-hand side of the machine in Figs. 2 and 10. In Fig. 14, the inner end of shaft 184 is shown to carry a worm gear 186 which engages a helical ring gear 187 secured to a nut arrangement which is threaded on the infeed screw shaft 185 (the latter appearing in Figs. 2, 14 and 15). Ring gear 187 is carried between annular collars 188 held in position in slide member 22 by means of two keyed collars 189. The inner teeth 190 of ring gear 187 engage the threads on shaft 185. Thus, when a wrench or handle is placed over the squared shaft end 184 and the latter turned, the gear 187 causes screw shaft 185 to move forwardly and backwardly to move the combined gear box 23 and hob carrier assembly 25 toward or away from the headstock-tailstock axis on slide bed members 21, 22. This fixes the upper or base-enclosed end of the infeed srcrew. Infeeding of the head 25 is accomplished automatically by movement of the other end by means described below.

Also visible in Fig. 10 is a switch arm 198 which is engaged by the switch arms 199 of a safety limit switch placed at the end of the slide 27—28 in order to prevent overtravel of the gear box thereon.

The power-operating mechanism for effecting infeeding is housed in the interior of the front of the machine. As shown in Figs. 14 and 15, the infeed screw shaft 185 is connected to an enlarged shaft 191 which has an infeed bracket 192 and a wear ring 192a which surrounds a Z-bar 193. The Z-bar 193 is secured to a piston rod 194 of the infeed hydraulic cylinder 61 by means of pins 195. The Z-bar 193 is journalled on ways 196 bolted to the front leg of the T-shaped machine base 20. When the piston rod 194 of the double-action cylinder 61 moves the Z-bar 193 axially on its ways, the shaft 191 is advanced or retracted a distance corresponding to the depth of cut according to the axial movements of the Z-bar 193. A stud bolt 197 serves as an adjustable end stop which will prevent overtravel in the outward direction of the piston rod 194 and consequent damage to Z-bar 193 or its ways 196, 196. The cylinder 61 is controlled by an automatic hydraulic system operating in timed relation with the main headstock and hob carrier drive systems. It is to be understood that the manual adjustment shaft 184 is used for positioning the hob carrier during setting up of the machine and for manual infeed during non-automatic operations. Z-bars of different size and proportion will yield different distances of infeed. The preferred method, however, is to utilize a large Z-bar and then control the depth of infeed solely by control of the infeed cylinder 61. The latter is reversible, of course, to return the hob spindle to its original position.

HOB SPINDLE DRIVE

As pointed out hereinabove, the bevel-faced pinion gear 163 in the main gear box 23 (Fig. 9) engages a like pinion gear 164 of the hob carrier assembly 25 (Fig. 12) at right angles one to the other. The gear 164 is keyed to a short horizontal shaft 200 and held in place thereon by a screw-fitted collar 201. The shaft 200 is journalled in an internally-attached circular casting 202 which is bolted to the inwardly-projecting flanged edge of plate 40 mentioned heretofore. The latter has a number of T-bolts 203, 203 fited into an annular T-shaped channel 204 integrally formed into the flanged leading edge 205 of gear box 23. When the bolts 203, 203 are loosened, the entire hob carrier assembly can be swiveled from one side to the other about the axis of groove 204 and annular bearing surface 179 according to the helix of the gear to be cut by shaft 177, as previously described. The shaft 200 is supported in four rows of ball bearings 206, 206 and held in position in casting 202 by a bolted on collar 207 and nuts 201. On the end opposite bevel-faced pinion gear 164 is a similar bevel-faced pinion gear 209 which meshes with a third pinion gear 210 carried by a vertical shaft 211. The latter shaft is also supported in casting 202 by double rows of ball bearings 212, the lower end of shaft 211 being held in position by a nut 215 and bolted on retainer collar 213 which supports the lower rows of bearings 212. At its top end, shaft 211 is supported in bearings 212 by means of a nut 215. The shaft 211 also has attached to it at the top a spur gear 216 which meshes with a similar gear 217 carried on a parallel second vertical shaft 218. The latter shaft is splined on a considerable length of its lower end so as to remain fully engaged with a bevel-faced pinion gear 219 carried by slide 43 despite crossfeed and relative movement of 43 and 41. The gear 219 meshes with another bevel-faced pinion gear 220 secured to splined horizontal pivot-drive shaft 45. The latter, as has been pointed out above, is the pivot point about which the plate-like outer hob carrier bracket 46 rotates. Shaft 45 is journalled in a sleeve bearing 45a. Bracket 46 is secured to the front edge of the hob support bracket 44 by means of T-bolts 46a in annular slot 46b. Rotation of the casting 46 about pivot shaft 45 sets the hob at the desired thread angle.

The pivot-drive shaft 45 carries on its left-hand end (Fig. 12) another bevel-faced pinion gear 221 which meshes with a like pinion gear 222 carried by a vertical hob drive shaft 223. As shown in Fig. 12, the shaft 223 carries on its upper end a heavy flywheel 224 to insure smooth positive rotation of the hob spindle 235 during cutting operations. The shaft 223 has on its lower end a simple bushing-type bearing 225 while its upper end, due to the great weight of the flywheel 224, is provided with a double row ball bearing 226 firmly supported in a retainer ring 227 formed in the hob carrier drive housing 46. Just below the flywheel 224, there is keyed to shaft 223 a spur gear 229 having an extended face or skirt-like projection 230. The elongated face or skirt 230 of gear 229 is designed to permit vertical movement of the hob spindle housing 232 relative to the hob carrier drive housing 228 with the hob spindle drive gear 231 remaining in engagement with the skirted gear 229 over the full length of the vertical travel.

As shown in Fig. 12, the upper hob spindle drive gear 231 is keyed to a short hob spindle drive shaft 233. The enlarged lower end 235 of hob spindle drive shaft 233 is supported in a pair of tapered roller bearings 234 and is flanged outwardly to form a hub. The hob arbor 32 has a tapered end which fits into the hub of tapered shaft 235 and is secured thereto by a long bolt 237 which is extended lengthwise of the arbor 32, threaded through a collar 238 and beyond into the hob spindle 235. The lower end of arbor 32 is supported in a tailstock 239 bolted to the hob spindle housing 232. A hob is installed on the arbor 32 by withdrawing the bolt 237, removing the arbor 32, pressing the hob onto the arbor in an arbor press so that it rests against the shoulder 240 on the arbor and then replacing the arbor 32 and bolt 237 and tightening the latter down so as the hob is tightly engaged against the shoulder 240.

HOB SHIFTER

As stated hereinabove, the hob arbor 32, the hob spindle 235 and hob spindle housing 232 are vertically movable relative to the hob drive housing 46 so as to enable the use of the full face of the hob during the same or consecutive hobbing operations. This is accomplished by a hob shifter mechanism which may be both manually- and power-operated. As shown in Figs. 12 and 13, a small bevel-faced pinion gear 250 is mounted on a short vertical screw 252, the lower end of which is threaded through a nut 253 bolted to the under edge of the hob spindle housing 232. The gear 250 meshes at right angles with a similar bevel-faced pinion gear 254 carried by a short horizontal shaft 255 journalled in the hob spindle support casting 46. The hob spindle housing 232 has machined edges 257 which fit into mating slide members 256 machined in hob-drive casting 46. Thus, when the handle 258 is turned, the shaft 255 is rotated and this moves screw 252 up or down in nut 253, the hob spindle housing 232 moving up and down on slide 256—257.

The movement of shaft 255 is also effected by hydraulic cylinder assembly 56 mounted aside the hob-drive casting 46 (Fig. 1). The piston rod 56a of the cylinder 56 carries on its lower end a gear rack 261 (Fig. 13) which meshes with a similar gear 262 carried by shaft 255. The shaft 255 thus is rotated by operation of cylinder unit 56. At the end of the travel of the piston 56a, the shaft 255, and therefore the entire hob shifter mechanism is fixed in position by engagement of a spring-loaded ratchet pawl 263 with the teeth of a small gear 264 also carried on shaft 255. When it is desired to return the shifter to its starting position, ratchet pawl 263 must be reversed and the shaft 255 rotated either by means of handle 258 or by means of cylinder 56. The hob shifter mechanism is moved only a small amount each succeeding cycle of the machine until it reaches its limit of travel. The hob must then be inspected by the operator, replaced, if necessary, and the shifter returned to its original position.

Figure 11:
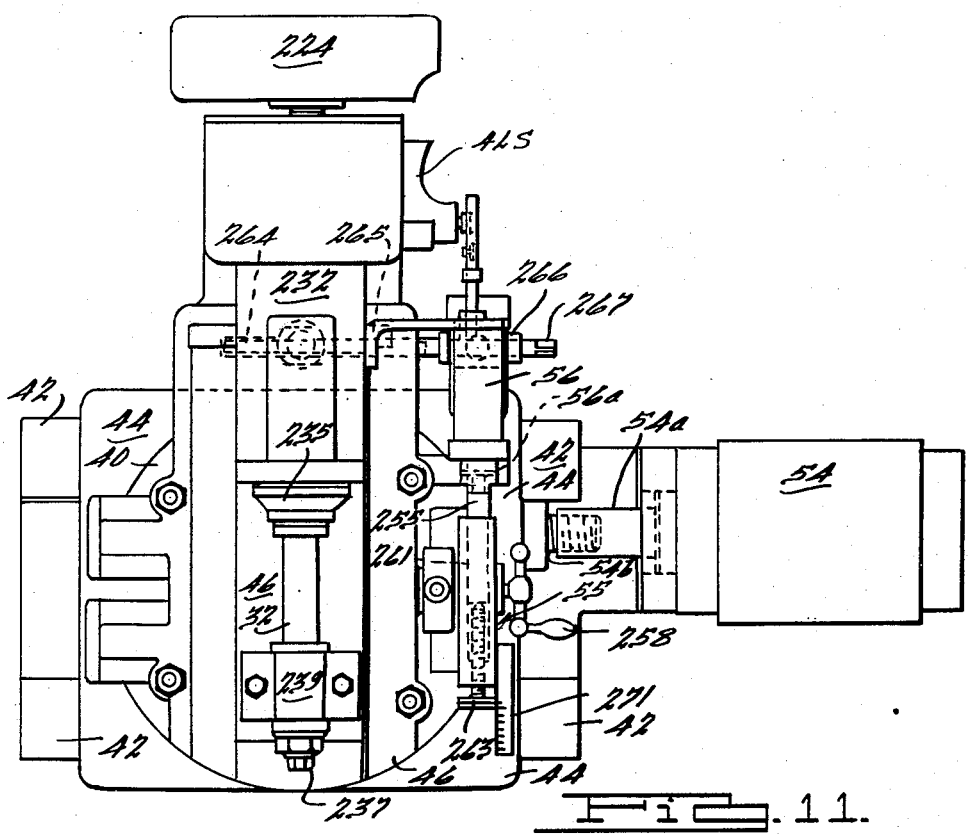
Fig. 11 is an enlarged fragmentary front view of the hob carrier device of the gear-hobbing machine of Figs. 1 to 10, showing the hob arbor and spindle in a vertical position.

As will appear in Fig. 11, a limit switch 4LS is located near the top of cylinder 56. It is this switch which shuts off the hob shifter when the end of its travel is reached, as explained above.

Figure 11A:
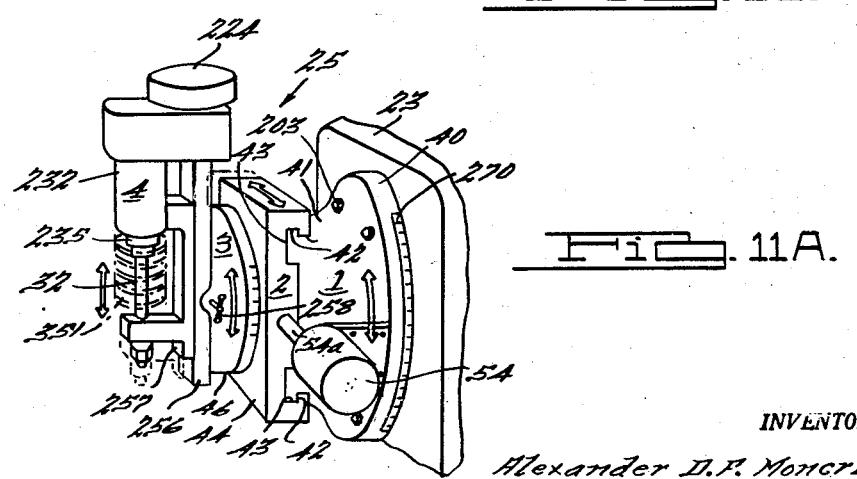
Fig. 11A is an isometric, diagrammatic representation of the hob carrier head assembly.

The hob carrier head assembly 25 just described is represented diagrammatically in Fig. 11A. The latter figure shows the head assembly to comprise four sections labelled generally 1, 2, 3 and 4. The portions shown are given the same numerals as the previous drawings, where possible. Section 1 shows that left- or right-hand helix angles of up to 45 degrees can be set on the vernier scale 270 adjacent the edge of circular plate 40. Section 2 contains the moving portion 43 of the hydraulically-actuated cross-feed slide 42, 43, this enabling the cylinder 54 to move the hob across the workpiece as compared to the vice versa operation of known gear hobbing machines. Section 1 can be swiveled around relative to the gear box 23, thereby cocking the cross-feed slide at the correct helix angle. Section 3 contains the rotatable portion of the hob spindle mounting, the swivel plate 46 being rotatable relative to the cross-feed plate 44. Plus or minus hob thread angles of up to 15 degrees can be set on scale 272 on the edge of plate 46. Section 4 contains the hob spindle 235, the vertical hob shifter slide members 256, 257 (and the associated manual shift handle 258), the hob arbor 32 and the hob itself (351). In an illustrative high-speed machine, the hob shifter mechanism is operative over a range of about three inches to use the entire surface of most hobs used on this type of machine. The distance of hob shift is shown to be readable on a small scale 271 on the front face of hob slide plate 44. Thus, the hob carrier head assembly incorporates four different motions, two rotational motions for moving and holding the hob at the correct angle, one transverse motion for side-feeding the hob and one vertical motion for shifting the hob. By means of the scales, the head assembly 25 can be set at pre-selected heights and angular displacements to cut the type of gear desired.

TAILSTOCK ASSEMBLY

The tailstock assembly 30 is shown in greater detail in Figs. 16 and 17 wherein it is shown that the entire assembly is mounted over the T-slots 300 in the machine base 20 with T-bolts 301 serving to anchor the assembly in position. The assembly is mounted on a key 302 and a tapered riser 303 in contact with a tapered upper key 304 to raise and lower the assembly for vertical alignment purposes. The riser 303 is positioned in slots in the tailstock base 305 and in the machine base 20. The key 302 is bolted to the tailstock base 305 and keys and base are both secured to the machine base by the T-bolts 301. The upper key 304 is positioned on riser 303 by means of a bolt or set screw 306 which is passed vertically through a washer 307 in an enlarged bolt hole 308, the large hole 308 permitting a small amount of axial movement of key 304 relative to riser 303. Endwise movement of key 304 is obtained by loosening bolt 306 and then advancing or retracting a second bolt 309 which is passed nearly horizontally through a gib 310 nested against a shoulder in key 304. This raises the tailstock for axial alignment with the headstock. The tailstock casing 305 is secured in position on key 304 by a pair of opposed transverse set screws 311 (Fig. 17), sufficient clearance being provided in the slot to provide a small amount of adjustment of set screws 311 for transverse alignment of the tailstock with the headstock.

The tailstock casing is composed of two main parts, one the tailstock base or casing 305, and the other a cylindrical head casing 312 located in the upper right-hand corner of the base 305 (as viewed in Fig. 17). The cylindrical tailstock head casing 312 has an end cap 313 (Fig. 16) through which the piston rod 314 of hydraulic cylinder 52 is passed. Inside the cylindrical outer tailstock casing 312 is an annular bushing 315 which is flanged on one end to be held in place by end cap 313. Inside the bushing 315 is an annular sleeve 316 flanged at the left-hand end and secured by an outer end plate or collar 318. The right-hand end is secured to an end cap or plate 317. The inner end plate 317 is slotted to receive a T-bolt 319 to which the piston rod 314 is attached. The plate 317 is secured to the sleeve 316 by means of a number of bolts 317a. The piston rod 314, therefore, can move the sleeve 316 and its end plates axially within bushing 315.

The tailstock center 53 is attached to a spindle 320 by means of a bolt on collar 321. The spindle 320 is fastened to the end of a short central tailstock shaft 322 by means of a stud bolt 323 and a set-screw fastened collar 324. Around the outer periphery of the tailstock center spindle 320 an oil slinger ring 325 is provided which fits under end plate or collar 318 to aid in keeping the spindle 320 in axial position. An outer bearing retainer 326 also fitted under end plate 318 bears against the outer of two tapered roller bearing races 327, the inner of which is fitted against a shoulder machined inside sleeve 316. The inner or right-hand end of the tailstock spindle shaft 322 is journalled in a double row ball bearing 328, a shoulder on shaft 322 and a self-locking nut 329 serving to hold these bearings in place. With this arrangement, the tailstock center 53 can rotate freely in response to the rotation imparted to the workpiece by the headstock. The hydraulic cylinder 52 can move the sleeve 316, the entire tailstock spindle shaft 322 and center 53 axially toward and away from the headstock.

In Fig. 16, the tailstock is shown in a fully retracted position. The movement effected by cylinder 52 is controlled by the automatic controls system. The movement of the tailstock spindle is necessary, of course, in order to insert and remove workpieces during either manual or automatic operation. As shown in Figs. 16 and 17, a safety limit switch 330 is provided to protect the tailstock in case of lack of attention by the operator or due to failure of the automatic control circuit. The switch 330 has a trip arm 331 extended outwardly in a position to be tripped by a collar 332 carried by a rod 333. The rod 333 is mounted on a downwardly-depending bracket 334 secured to the inner sleeve 316 and extending through a slot 335 in the tailstock head casing 312. By positioning the collar 332 at a proper position on rod 333, the switch 330 will cause the tailstock center to advance or retract a selected distance for insertion or removal of workpieces during either manual or automatic operation. This same switch also operates a timer, as will be explained below. Manual operation of the tailstock is effected by in-out buttons on the switch panel 47, such buttons cutting the infeed cylinder out of the automatic controls system.

GEARING SYSTEM

Figure 18:
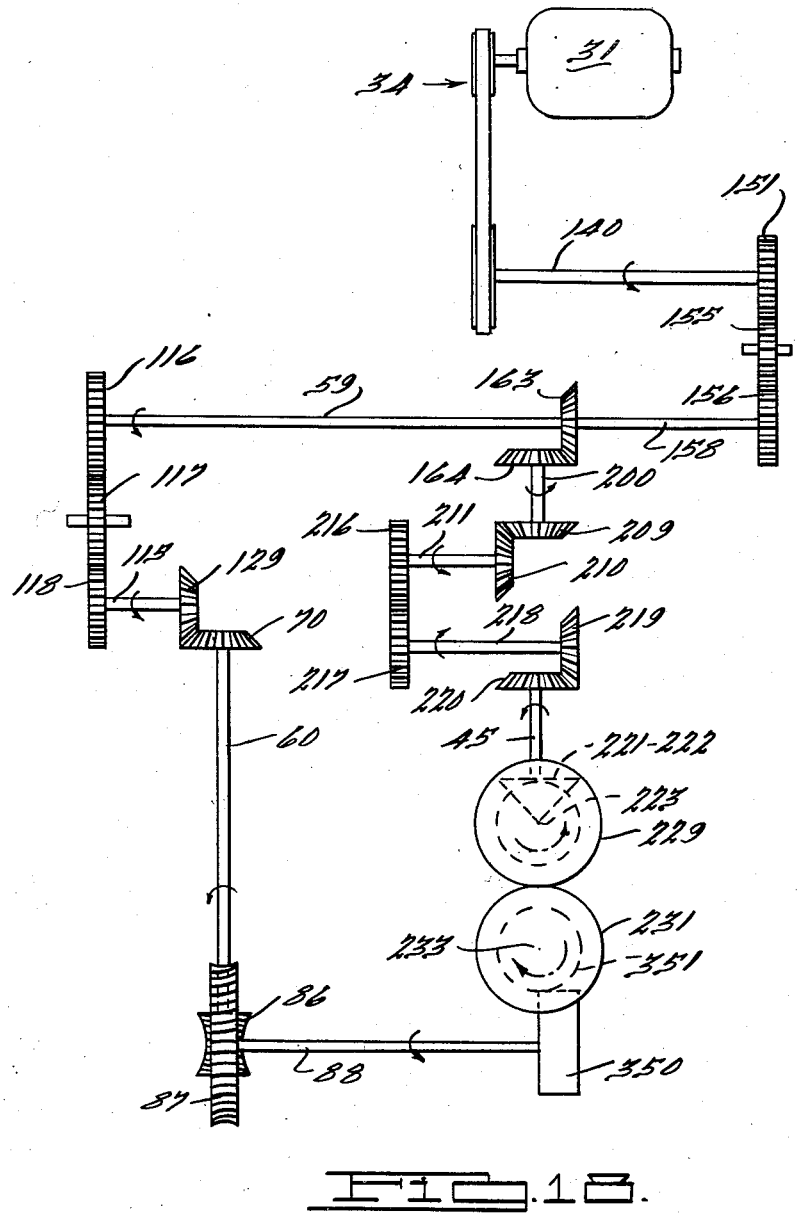
Fig. 18 is a schematic gear drive diagram for the gear-hobbing machine of Figs. 1 to 17.

In Fig. 18 there is shown a diagrammatic representation of the entire gearing system of the hobbing machine as shown in detail in Figs. 1 to 17. In this figure, the gears and shafting are given the numerals used hereinbefore. At the top appears the main drive motor 31 and the multiple V-belt drive 34, which turns shaft 140 in either direction. The latter transmits the rotation through change or speed gears 151, 155 and 156 to shaft 158. At this point, the gear 163 on shaft 158 meshes with gear 164, the hob spindle drive take-off gear. Shaft 158 is continued over to telescoping shaft 59 which carries the top ratio gear 116. From thence, the rotation is transmitted through ratio gears 116, 117 and 118 to shaft 115 and headstock power take-off gears 129, 70. Shaft 60 is another telescoping shaft which transmits the rotation to worm gears 86, 87 and finally to the headstock shaft 88 and the workpiece 350.

The hob drive gears 163, 164 turn shaft 200 and gears 209, 210 and shaft 211. Shaft 211 rotates gears 216, 217 and shaft 218. Gears 219 and 220 connect with the hob pivot shaft 45 which drives the bevel pinion gears 221, 222 and rotates the hob carrier drive shaft 223. The skirted gear 229 drives the hob spindle shaft 233 through hob spindle gear 231. The hob, indicated by the numeral 351, is driven in contact with the workpiece 350 in the direction of the arrow for a climbing cut. For conventional cut the main drive motor 31 is reversed.

With this gearing arrangement, and using an electric motor rated at 1800 R. P. M., as for example, the hob spindle and arbor will be rotated at 721.5 R. P. M. using equal size gears in the change gear box and in gear sets 163—164, 209—210, 216—217, 219—220, 221—222, and 230—231.

In use, the hob 351 (Fig. 18) is installed on the arbor 32 and the hob carrier assembly 25 properly positioned on the compound slide mechanism 21—22—27—28 by manually cranking it into position, as explained above. The workpiece 350 is then inserted in the headstock-tailstock assembly and the machine is ready to operate. Of course, as detailed below in connection with Figs. 19 and 20, the workpiece may be handled by a vibratory type parts feeder, a loader and ejector, not shown in Figs. 1 to 18.

The operator "sets up" the machine by cranking the compound slide mechanisms to position the hob relative to the workpiece, according to the diameter of the gear. He then loosens T-bolts 204 to set the hob carrier assembly at the correct helix angle, as read on scale 270. Next, he loosens T-bolts 46 and sets the hob carrier housing 232 at the correct hob lead angle, as read on scale 272. The bolts 204, 46 are then tightened and the machine is then ready for manual or automatic operation.

ELECTRICAL CONTROLS SYSTEM

Referring now to Fig. 19, the electrical controls system will be seen to control the operation of the reversible main drive motor 31, the hydraulic pump motor 50, and the coolant pump motor 57 and also a lubrication system 370, a parts feeder 372 of the vibrating type and a hydraulically-operated loader and an ejector, such as shown in my Patent No. 2,649,032. Fig. 19 also shows ten solenoid type valves for controlling the operation of the various hydraulic cylinders which operate the reciprocating parts of the machine. The above motors and solenoid valves are operated by nine limit-type switches attached to various parts of the machine.

Power is supplied to the system by input leads L1, L2 and L3 connected to 440 volt, 60 cycle supply. A main line switch 374 is provided to cut off all power. The three-phase motors are connected in parallel across leads L1, L2 and L3. Power for the controls is provided by a single-phase 220–110 volt transformer 376 connected across leads L1 and L2, the output voltage of the transformer preferably being ordinary 110 volt, 60 cycle alternating current. Pressing the start button 378 energizes a starter 380 which controls the hydraulic pump motor 50. The latter runs continuously until the stop button 382 is pressed, a current failure occurs or any overload relay 383 on any of the three motors is tripped. The entire control circuit is interlocked with starter 380 so that all motion is terminated if it is de-energized. A manually-operated coolant on-off switch 384 is provided to energize the starter 385 of the coolant motor 57 if coolant is required during the hobbing operation.

The operation of the main drive motor 31 is controlled by a "run-stop" switch 386 which must be pressed by the machine operator when starting up. The start button 378, the stop button 382, the coolant on-off switch 384 and the run-stop switch 386 are accessible on the panel 47 mounted on the front of the machine shown in Fig. 1. Pressing of the "run-stop" switch will not terminate the cycle until after the ejection of the finished piece, irrespective of when it is pressed. Moving the switch to "run" will initiate a cycle or cause one to repeat. Also provided is a "return" button 388, the operation of which will terminate a cycle at any point and cause it to reverse in sequence and then stop. In the absence of any other operator action, once the "run" button of the "run-stop" switch is pressed, a normal cycle will follow and be successively repeated as long as the hopper of the loader is supplied with work pieces.

Assuming that the hydraulic pump and coolant motors have just been started, pressing the "run" button will energize solenoid valves 7SV and 10SV and the loader mechanism (not shown) associated with feeder 372 will move forward, thereby engaging limit switch 1LS. The latter switch energizes solenoid 1SV and timer 1TR (a pneumatic timing relay). Solenoid 1SV causes tailstock cylinder 52 to move the tailstock in with the center 53 engaging the workpiece and chucking it up in the workpiece holder 103. Operation of solenoid 1SV also operates the hob shift cylinder 56 to move the hob vertically to bring a new portion of its face area not used in the previous cycle into position for the coming cycle. Timer 1TR maintains the inward movement of the tailstock for a prescribed time. When the tailstock has fully seated the work, the former engages limit switch 5LS, which de-energizes timer 1TR. Should 1TR time out before switch 5LS is engaged, control relay CR is energized which de-energizes 1SV and 7SV, and in sequence, energizing solenoids 2SV, 8SV, and 9SV, respectively, to withdraw the tailstock, return the loader, and eject the workpiece. However, when limit switch 5LS is properly and timely engaged by the tailstock, the former energizes main drive motor starter 390 and solenoid 3SV. This starts the drive motor 31 to rotate the workpiece and hob and the latter operates the infeed cylinder 61 to bring about the infeed cut. At the end of the infeed cut solenoid 5SV is energized, the latter operating the sidefeed cylinder 54 causing the hob to move sidewardly to generate the final tooth form. It is the general practice to operate the sidefeed cut towards the headstock rather than toward the tailstock. If desired, the piping of the sidefeed cylinder 54 can be reversed for reverse cut. At the end of the sidefeed cut the gear is fully hobbed.

At the completion of the sidefeed motion, a limit switch 9LS, located near the hob carrier slide 42—43, is engaged, the latter energizing control relay CR. Control relay CR in turn de-energizes solenoids 3SV, 1SV, 10SV and 7SV and energizes solenoid 4SV to reverse the infeed cylinder 61 and move the hob out of the work. This motion disengages 7LS which de-energizes solenoid 5SV, the sidefeed advance solenoid. At the end of the infeed "out" stroke, limit switch 8LS is re-engaged. The latter energizes solenoids 2SV and 6SV, respectively, to reverse the tailstock cylinder 52 and move the tailstock back and return the sidefeed cylinder 54 to its original position. At the same time, solenoid 2SV operates the hob shifter cylinder 56 which shifts the hob vertically so as to expose the unused area of the hob for the next cycle. The disengagement of limit switch 5LS by the tailstock be-energizes the main drive motor starter 390. When the tailstock is fully retracted, limit switch 6LS is re-engaged, the latter energizing solenoid 8SV to retain the loader from the work to the loading position. The loader re-engages limit switch 2LS which energizes solenoid 9SV to operate the ejector and eject the hobbed gear. Movement of the ejector engages limit switch 3LS and the latter de-energizes control relay CR, which in turn de-energizes solenoids 9SV, 2SV, 4SV, 6SV, 8SV and energizes 10SV, the latter to return the ejector to the loading position. The cycle has then been completed. With the run-stop switch 386 in the "run" position, solenoid 7SV is re-energized and the cycle repeats.

After a certain number of cycles have caused the hob shift mechanism to travel to its final limit, wherein the full face of the hob has been utilized, limit switch 4LS is engaged and prevents re-energizing of solenoid 7SV and lighting a signal light 392. The operator must then inspect the hob, and if it is still in good condition, crank the hob shifter mechanism by means of handle 258, or reversing hob shifter pawl 263 and cranking until limit switch 4LS is de-energized. Optionally, the latter switch may be omitted in which case the shifter would reach the end of its travel and stay there until reversed.

An electric eye 394 located in the loader will be actuated when its hopper is low, in turn energizing the vibratory feeder 372 and timer 2TR. The latter maintains operation of the feeder after workpieces reach the level of the electric eye for a period sufficient to completely fill the hopper on the loader.

HYDRAULIC CIRCUIT

In Fig. 20, the main hydraulic pump motor 50 drives a hydraulic pump 51 which withdraws fluid from a reservoir 398, pumps it through an integral pre-set pressure valve indicated generally by the numeral 400 through a line 401 and check valve 402. The line 401 is connected to the tailstock cylinder 52, the infeed cylinder 61, and the sidefeed cylinder 54. The hob shift cylinder 56 and its locking cylinder 56a are connected directly to the tailstock in-out valves so as to be operable with the tailstock on the first and last steps of the cycle. The tailstock cylinder 52 is connected by line 404 through check valve 406 to a double solenoid valve arrangement 408 which contains solenoid valves 1SV and 2SV. Likewise, infeed cylinder 61 is connected to line 401 through a solenoid valve 410, check valves 412, 413 to a directional solenoid valve arrangement 414 (solenoid valves 3SV and 4SV). A flow control valve 415 controls the speed of movement of the infeed cylinder 61. Solenoid 410 cooperates with valve 414 to balance the pressure on both ends of cylinder 61 in order to prevent a "jump" at the start of the infeed stroke. The sidefeed cylinder 54 also is connected to line 401 through check valves 417, 418 and 419, a balancing solenoid valve 416 and a directional solenoid valve arrangement 420 (solenoid valves 5SV and 6SV), and a flow control valve 421 is provided to control the speed of movement of cylinder 54. The loader and ejector cylinders, not shown, are similarly connected for smooth operation. Return lines are shown for all cylinders.

The circuit of Fig. 20 functions in such a way that with all the solenoids de-energized, delivery of pump 51 is returned to the reservoir tank 398 through integral fixed pressure valve 400 at its adjusted setting while holding cylinders 52, 54 and 61 retracted and hob-shift cylinder 56 extended. In this position, the electrical controls system initiates a sequence of operations, detailed by the numerals 1–6 in Fig. 20 alongside the cylinders, as follows:

*Sequence*

1. Tailstock cylinder advance
2. Infeed cylinder advance
3. Sidefeed cylinder advance
4. Infeed cylinder return
5. Sidefeed cylinder return
6. Tailstock cylinder return These operations are more fully detailed in connection with the description of Fig. 19, above.

What is claimed is:

1. In a hobbing machine, a hob carrier head assembly for mounting a hob on a generally vertically disposed axis for operation on a workpiece mounted on a generally horizontal axis, said assembly comprising a base rotatably mounted on said machine for rotation in a generally vertical plane whereby said hob may be aligned at the correct helix angle of the gear to be cut, a slide mechanism rigidly connected to said base so as to be rotatable thereby and operable in a generally horizontal direction and parallel to said workpiece axis for side-feeding said hob, a hob support bracket rotatably connected to said sidefeed slide and having a vertically disposed hob shifting slide thereon, said bracket being rotatable in a generally vertical plane whereby said hob may be aligned at the correct hob lead angle, a hob spindle housing slidably carried by said bracket so as to be shiftable in a generally vertical direction, a hob spindle mounted in said spindle housing, means for rotating said spindle, both manual and power operated means for shifting said hob spindle housing vertically on said hob shifter slide, said means comprising a screw journaled in said hob shifter slide and threadably attached to said hob spindle housing, a gear attached to said screw, a shaft bearing three gears and located so that one of said last named gears meshes with said gear on said screw, a manual handle on said shaft, a hydraulic piston and cylinder unit including a piston rod, a gear rack carried by said piston rod, said gear rack engaging a second of the said gears on said shaft, and a spring operated ratchet pawl mounted so as to engage the third said gear on said shaft.

2. In a hobbing machine, a hob carrier head assembly for mounting a hob on a generally vertically disposed axis for operation on a workpiece mounted on a generally horizontal axis, said assembly comprising a base rotatably mounted on said machine for rotation in a generally vertical plane whereby said hob may be aligned at the correct helix angle of the gear to be cut, a slide mechanism rigidly connected to said base so as to be rotatable thereby and operable in a generally horizontal direction and parallel to said workpiece axis for side-feeding said hob, a hob support bracket rotatably connected to said sidefeed slide and having a vertically disposed hob shifting slide thereon, said bracket being rotatable in a generally vertical plane whereby said hob may be aligned at the correct hob lead angle, a hob spindle housing slidably carried by said bracket so as to be shiftable in a generally vertical direction, a hob spindle mounted in said spindle housing, means for rotating said spindle, and both manual and power operated means for shifting said hob spindle housing vertically on said hob shifter slide, said means comprising a screw journaled in said hob shifter slide and threadably attached to said hob spindle housing, a gear attached to said screw, a shaft bearing three gears and located so that one of said last named gears meshes with said gear on said screw, a manual handle on said shaft, a hydraulic piston and cylinder unit including a piston rod, a gear rack carried by said piston rod, said gear rack engaging a second of the said gears on said shaft, and a spring operated ratchet pawl mounted so as to engage the third said gear on said shaft, and control means for automatically actuating said piston and cylinder unit to shift said hob spindle housing automatically after each traverse of the hob in contact with the workpiece.

References Cited in the file of this patent
UNITED STATES PATENTS

| | | |
|---|---|---|
| 1,022,667 | Fawcus | Apr. 9, 1912 |
| 2,356,796 | Purvin | Aug. 29, 1944 |
| 2,374,255 | Davenport | Apr. 24, 1945 |
| 2,414,790 | Barnard et al. | Jan. 28, 1947 |
| 2,528,242 | Praeg | Oct. 31, 1950 |
| 2,563,982 | Warner | Aug. 14, 1951 |
| 2,629,290 | Staples et al. | Feb. 24, 1953 |
| 2,700,324 | Staples et al. | Jan. 25, 1955 |
| 2,769,375 | Moncrieff | Nov. 6, 1956 |

FOREIGN PATENTS

| | | |
|---|---|---|
| 141,002 | Australia | Apr. 30, 1951 |
| 275,620 | Great Britain | Nov. 2, 1928 |
| 297,483 | Germany | Apr. 20, 1917 |
| 708,767 | Great Britain | May 12, 1954 |
| 1,072,830 | France | Mar. 17, 1954 |